United States Patent [19]

Bullmann et al.

[11] Patent Number: 5,402,439
[45] Date of Patent: Mar. 28, 1995

[54] PROCESS AND APPARATUS FOR DISPOSING OF DUST-FORM SUBSTANCES FROM COMBUSTION PLANTS

[75] Inventors: Guido Bullmann, Essen; Josef Chwieralski, Ratingen; Peter Jeschka, Bottrop; Gero Rath, Mühelm; Hartmut Stöckmann, Hattingen; Todor Vlajcic, Duisburg, all of Germany

[73] Assignees: RWE Energie Aktiengesellschaft, Essen; Mannesmann Aktiengesellschaft, Dusseldorf, both of Germany

[21] Appl. No.: 14,543

[22] Filed: Feb. 8, 1993

[30] Foreign Application Priority Data

Feb. 18, 1992 [DE] Germany .................. 42 04 769.2

[51] Int. Cl.⁶ .................................... F27D 17/00
[52] U.S. Cl. ......................................... 373/9; 373/8; 110/345
[58] Field of Search .............. 373/9, 8, 17, 34, 80; 110/342, 234, 245, 347; 75/685, 672; 423/442, 111

[56] References Cited

U.S. PATENT DOCUMENTS

| | | | |
|---|---|---|---|
| 4,099,019 | 7/1978 | Horibe et al. | 373/82 |
| 4,242,532 | 12/1980 | Squibbs | 373/9 |
| 4,410,996 | 10/1983 | Svensson | 373/9 |
| 4,655,437 | 4/1987 | Fritz et al. | 266/197 |
| 4,865,643 | 9/1989 | Goins et al. | 75/10.63 |

Primary Examiner—Bruce A. Reynolds
Assistant Examiner—Tu Hoang
Attorney, Agent, or Firm—Herbert Dubno

[57] ABSTRACT

Dust like substances which are recovered from a garbage or refuse incinerator are destroyed, eliminated or disposed of by smelting in a low shaft electric furnace having at least one electrode heating a slag melt therein. The dust is introduced into the melt by a lance opening beneath the melting surface and gas produced by the smelting process is subjected to cleaning. The slag may be continuously or discontinuously withdrawn and slag formers may be compensatorily added. A metal bath consisting predominantly of iron may be provided below the slag melt to protect metallic components of the dust upon the smelting thereof.

8 Claims, 1 Drawing Sheet

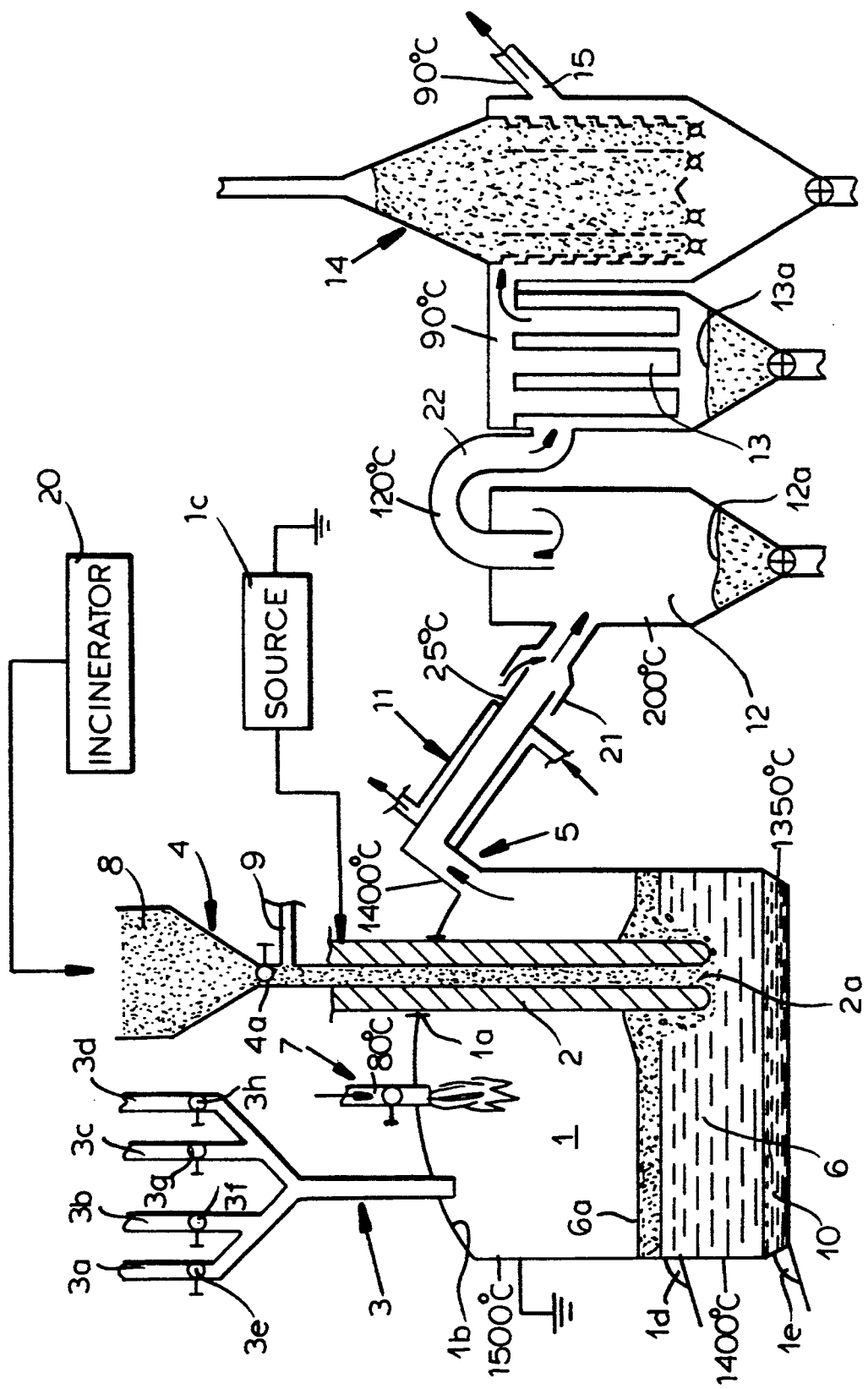

PROCESS AND APPARATUS FOR DISPOSING OF DUST-FORM SUBSTANCES FROM COMBUSTION PLANTS

FIELD OF THE INVENTION

The present invention relates to a method of disposing of dust-form substances arising from combustion plants, especially garbage and refuse incinerators by a smelting process. The invention also relates to an apparatus for eliminating or destroying such substances. The term "dust-form substances" or "dust-like substances" is used to describe especially flyash from flue gas cleaning plants. Coke and coal particles can be entrained therewith. "Dust-form substances" also include reaction products of flue gas cleaning, metallic dusts, condensates and grate ash. The dust-form substances are laden with contaminants and have hitherto required destruction and expensive disposal process. The grate ash is the ash which in power plant boilers, for example, generally accumulates beneath the grate.

The dust-form substances can be collected by any of various filtering methods which are commonly used in gas cleaning, including, bag, fabric, cartridge, electrostatic filtering techniques, other particulate separation techniques which give rise to fine particles and techniques which result in fine particles as a result of drying moist collections thereof.

More particularly, the invention relates to the elimination of such particulate products by incorporating them into a melt or bath, generally involving dissolution, suspension in the bath, melting per se or otherwise trapping or incorporating the particles in a melt.

BACKGROUND OF THE INVENTION

Garbage and refuse incinerators, commonly give rise to dust-form substances which are predominantly recovered in the form of fly ash and, as noted, but also can include finely divided coal products, finely divided coke particles and the like. The dust-form particles also include reaction products resulting from the flue gas treatment, e.g. by the addition of reactants seeking to combine sulfur or sulfur containing compounds, metal rich dust, condensate and grate ash or the like. The dust like substances may be separated out prior to treatment of the flue gas, during the cleaning of the flue gas or derived from the processing of ash. As mentioned such dust-form substances containing toxic or noxious materials and thus disposal of them frequently poses a problem or can be comparatively expensive.

It has been proposed heretofore to eliminate such materials or dispose of them by a smelting process. For example, a smelting furnace which is heated by special heating rods has been described in which the heat of the rods is transformed exclusively by reaction to the melt. The melt is a glass slag melt.

The dust-form materials to be disposed of are spread upon the glass slag melt by means of a worm conveyor.

In another approach, a smelting destruction of the dust-form substances from a flue gas cleaning plant is effected with plasma heated burners which may be arranged in a star pattern, at the center point of which, the dust meets the jets of the plasma and is heated.

The molten product drops into the glass slag bath disposed therebelow.

One of the problems of this latter process is that a large proportion of the dust-form substances tends to be entrained from the smelting furnace with the waste gas or smoke flowing therefrom. When the dust-form substances include or are constituted by fly ash, it is found that only about 70% of the fly ash is incorporated into the glass or transformed thereto while the balance is entrained out of the melting furnace.

The high plasma temperature is transferred by both radiation and convection to the dust-form substances and from these substances there can be considerable evaporation losses.

It is also possible, in accordance with prior art techniques to operate with glass melting furnaces in which a glass slag is maintained. In these systems, the dust-like substances to be smelted are spread onto the surface of the glass slag and dispersed thereby by a stirrer.

This arrangement has the drawback that the dispersal of material spread upon the slag may not be sufficiently uniform or is incomplete. The glass melt and the rising gasses are relied upon to heat the floating material to the melting point, and as a consequence, the materials are not fully incorporated into the glass slag. Nonusable residues may also result.

All of these earlier systems are comparatively expensive, are incapable of satisfactorily destroying all of the dust-like substances, are characterized by a high proportion of residues which cannot be processed or are discharged, or give rise to vaporization losses. Accordingly, improvement in the disposal of such dust-like substances is desirable.

OBJECTS OF THE INVENTION

It is, therefore, the principal object of the present invention to provide an improved method or process for the disposal, elimination or destruction of dust-form substances from combustion plants and especially garbage and refuse incinerators, which is simpler and more reliable then earlier techniques and which can be carried out without significant evaporation losses or residues.

Another object of the invention is to provide an improved method of destroying such dust-form substances whereby drawbacks of the prior art processes are obviated.

It is also an object of this invention to provide an improved apparatus or plant for the smelting of dust-form substances and especially for carrying out the improved process of the invention, which can be matched to varying operating conditions resulting from differences in the compositions of the materials to be destroyed and the volumes thereof which must be processed.

SUMMARY OF THE INVENTION

These objects and others which will become apparent hereinafter are attained, in accordance with the invention in a method of destroying the dust-form substances from combustion plants, especially garbage incinerators, by smelting and combining the following features:

(a) For the smelting a low shaft electric furnace is used having at least one electrode extending through a wall of the furnace in a gas tight manner;

(b) A slag melt bath is generated and maintained in the electric arc furnace by supplying electrical energy thereto at least in part by electrically energizing the aforementioned electrode; and (c) The dust-form substances are introduced into the bath by an immersion lance, i.e. a lance opening below the surface of the bath.

The smeltable components of the dust like materials are thus incorporated into the slag and the slag with these components incorporated therein can be withdrawn continuously or from time to time. The waste gas which is produced is, according to the invention, subjected to a waste gas cleaning.

It is self-understood that, with continuous tapping of the slag, there must be a continuous reformation thereof and hence the feed of slag forming agents to the bath. The toxic substances present in the dust like material which is destroyed are decomposed during the smelting operation.

In a preferred embodiment of the invention, the bath formed by the slag melt is covered with a coke layer and the dust like substances are injected into the bath between the immersion lance below the coke covering. This ensures that the smelting of the dust like substances will be carried out under reducing conditions in the slag.

The reducing condition, in turn, ensures that the sulfur compounds which may be present in the dust-form substances will be bound in the slag as calcium sulfide.

If application of a coke layer cannot be realized, reducing conditions in the slag can be maintained without difficulty by the addition of coal or other carbon containing agents with the slag and by introducing these reducing agents with the slag formers.

It is also possible to operate under nonreducing conditions, in which case the sulfur compounds will be transformed into sulfur oxides which pass into the waste gas which is discharged and can be removed in the subsequent gas cleaning stage.

The invention is based upon the realization that in the metallurgical field a low shaft electric furnace can be readily used without difficulty for smelting materials which might otherwise be difficult to melt and our recognition that this type of furnace can be employed advantageously to smelt dust-form substances in the combination of features set forth above. For the use of an electric low shaft furnace, no material adaptation is required and the principle of furnace operation remains practically unchanged when the furnace is used to dispose of dust-formed substances as described.

Above the coke layer covering the bath, air and/or oxygen can be blown into the furnace to transform metal vapors or the like in the waste gas into metal oxides enabling them to be removed more easily in the waste gas cleaning stage.

The waste gas cleaning can be effected by the usual methods including the use of cyclones, tube, cartridge and bag filters and, preferably, sorption systems downstream of the filters. Wet gas cleaning, e.g. by scrubbing, can also be used.

If the process of the invention is carried out in a charge or batchwise manner, it is possible to operate at the beginning of the smelting process with a calcium rich slag and toward the end of the batch to form a glass slag by the addition of sand. In this case, during the first phase a highly intensive sulfur binding operation is carried out.

When the dust like material contains metals or metals are added to the dust like materials, a metallic bath, usually consisting predominantly of molten iron can be provided beneath the slag bath to collect metals from the dust like materials. This metal bath can be withdrawn from time to time or continuously.

Preferably the injection of the dust like materials into the bath is effected with cooled immersion lances. According to a particular feature of the immersion, the electrode is a hollow electrode which also serves as an immersion lance. With the system of the invention, highly voluminous, environmentally detrimental dust like substances can be smelted electrically using a compact slag of a glassy consistency and, depending upon the composition, with formation of a molten metal phase which can be supplied directly to a metal processor, metallurgical plant or foundry. The waste gases are practically free from toxic or noxious materials and can be readily cleaned in the usual flue gas cleaning plant of the combustion facility.

More specifically the method of the invention comprises the steps of:

(a) maintaining a slag-melt bath in a low-shaft electrical furnace by supplying electrical energy to the bath at least in part through electrical energization of at least one electrode extending with a gas-tight seal into the furnace;

(b) introducing dust-form substances to be destroyed into the bath through a lance extending into the bath, whereby smeltable components of the substances are incorporated into the slag and a flue gas is formed in the furnace above the bath;

(c) withdrawing the flue gas from the furnace and subjecting the withdrawn flue gas to gas cleaning; and (d) tapping the slag from the furnace.

The apparatus can comprise:

a low-shaft electrical furnace having at least one electrode extending with a gas-tight seal into the furnace;

a lance extending into a slag-melt bath maintained in the furnace by a supply of electrical energy thereto through the electrode for introducing dust-form substances to be destroyed into the bath whereby smeltable components of the substances are incorporated into the slag and a flue gas is formed in the furnace above the bath;

means for withdrawing the flue gas from the furnace and subjecting the withdrawn flue gas to gas cleaning; and means for tapping the slag from the furnace.

BRIEF DESCRIPTION OF THE DRAWING

The above and other objects, features, and advantages will become more readily apparent from the following, reference being made to the accompanying drawing in which the sole FIGURE of which is a flow diagram illustrating an apparatus for carrying out the process of the invention.

SPECIFIC DESCRIPTION

The apparatus illustrated in the sole figure of the drawing which also represents a specific example by indicating the temperatures at the various stages of the process, comprises a low shaft electric furnace having at least one electrode 2 in the form of a tubular lance which passes through a gas tight seal 1a in the top 1b of the furnace and has a mouth 2a opening into a slag bath 6 maintained in the furnace. The electric current source is represented at 1c in the drawing.

The furnace 1 forms a smelting furnace for the dust-form material and is equipped with a device 3 for metering slag formers into the furnace through the cover or top wall 1b thereof. In addition, the furnace comprises a device 4 for feeding the dust-form substances to the furnace and a device 5 for discharging the waste gas.

The slag melt bath 6 can be tapped from the furnace continuously or discontinuously by a tap 1d and can overlie a molten metal melt 10, predominantly of iron which can be tapped continuously or discontinuously from the furnace at 1e.

Above the bath 6, the furnace 1 is equipped with a device 7 for feeding oxygen containing gas, e.g. air or oxygen to the furnace to oxidize any metal vapor in the waste gas above the slag melt 6. The device 3 for feeding the slag formers to the furnace can have separate feed lines 3a, 3b, 3c and 3d with respective metering controls 3e, 3f, 3g, 3h, for supplying the various additives, for example, iron ore, calcium oxide, and coke.

The dust like material is fed by the device 4 from a dust bunker or via 8 or some other dust source, for example, a dust removal unit of a garbage or refuse incinerator represented at 20, having a metering device 4a and feeding the tubular electrode 2 which forms an immersion lance opening, as noted, at 2a below a layer 6a of coke on the slag bath 6. A fitting 9 can connect a source of a carrier fluid to the lance or electrode 2 to maintain the dust like material into the melt.

The waste gas rising from the melt passes via a heat exchanger 11 which cools this waste gas before it flows into the cyclone 12.

A venturi intake 21 drawing cool ambient air into the cyclone with the waste gas, further cools the gas mixture which is subjected to particle separation by dilution of the waste gas. Heavier dust particles are separated from the waste gas at 12a in the cyclone while lighter dust particles may be entrained with the waste gas from the cyclone via the duct 22 into a hose type fabric filter 13 which collects the lighter particles at 13a. Residual gas passes through a sorption filter containing activated carbon or activated coal and is discharged at 15 to any further gas cleaning apparatus which may be desired, e.g. a scrubber.

We claim:

1. A method of eliminating dust-form substances from combustion plants by a smelting thereof, said method comprising the steps of:
    (a) maintaining a slag-melt bath including a slag in a low-shaft electrical furnace by supplying electrical energy to said bath at least in part through electrical energization of at least one electrode extending with a gas-tight seal into said furnace;
    (b) introducing dust-form substances to be destroyed into said bath through a lance extending into said bath, whereby meltable components of said substances are incorporated into said slag and a flue gas is formed in said furnace above said bath during destruction of said dust-form substances;
    (c) withdrawing said flue gas from said furnace and subjecting the withdrawn flue gas to gas cleaning;
    (d) tapping said slag from said furnace, said slag-melt bath being initially a calcium-rich slag; and
    (e) during destruction of the dust-form substances, adding sand to said slag to transform said calcium-rich slag into a glass slag.

2. The method defined in claim 1 wherein said slag is tapped discontinuosly from said furnace.

3. The method defined in claim 1 wherein said slag is tapped continuously from said furnace.

4. The method defined in claim 1, further comprising the step of covering said bath in said furnace with a layer of coke, said dust-form substances being introduced into said bath by said lance below said layer of coke.

5. The method defined in claim 1 wherein said slag contains reducing compounds.

6. The method defined in claim 1, further comprising the step of blowing an oxygen-containing gas into said furnace above said bath, thereby oxidizing metal vapor in said furnace above said bath to metal oxide so that the withdrawn flue gas contains said metal oxide, said gas cleaning including removing said metal oxide from the flue gas.

7. The method defined in claim 1 wherein a metal bath comprised predominantly of iron is formed beneath said slag-melt bath, further comprising the step of maintaining said metal bath during destruction of said dust-form substances in said slag.

8. The method defined in claim 1 wherein said electrode is tubular and hollow and forms said lance, said dust-form substances being fed to said bath through said electrode.

* * * * *